March 9, 1948.  E. F. MURRAY ET AL  2,437,331
FISH STRINGER
Filed Nov. 20, 1945
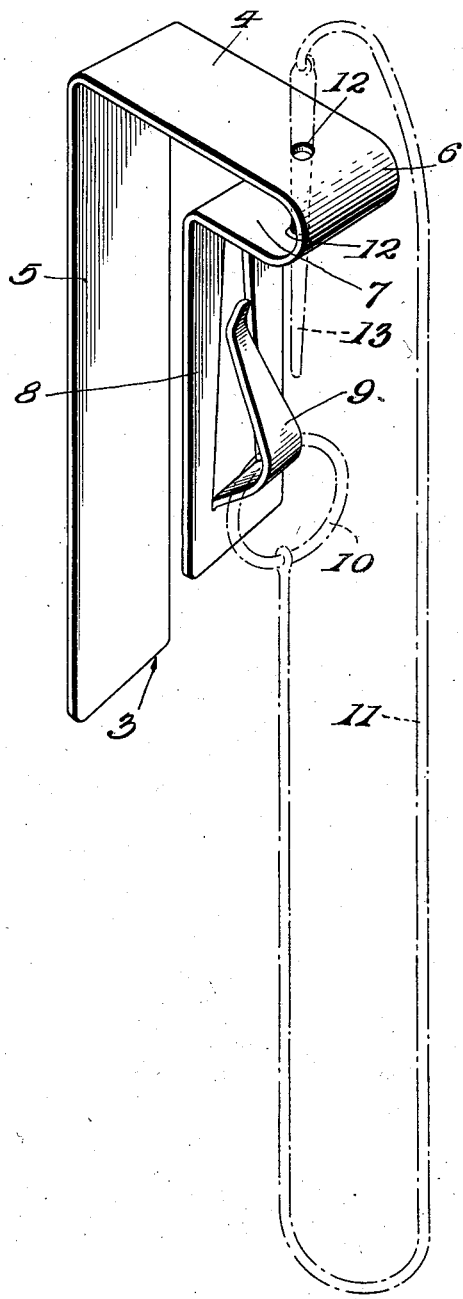
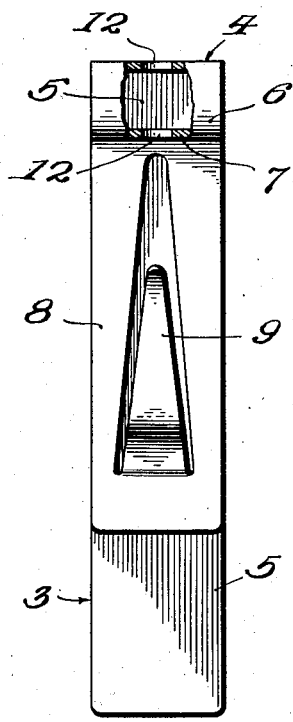
Inventors
*Earl F. Murray and
Clare E. Hermann*
By *H. A. Wilson & Co.*
Attorney Patented Mar. 9, 1948

2,437,331

UNITED STATES PATENT OFFICE 2,437,331

FISH STRINGER

Earl F. Murray and Clare E. Hermann, Minneapolis, Minn.

Application November 20, 1945, Serial No. 629,906

2 Claims. (Cl. 224—7)

The invention relates to a fish stringer for use by fishermen in stringing the fish caught and suspending them in the water.

It is quite common in stringing fish to use a stringing line having a spike in one end and a ring on its other end, and the invention aims to provide a simple, inexpensive and advantageous device for reliably connecting both ends of such a stringing line to a boat, in such manner that the spiked end may be quickly and easily released each time a fish is to be strung and may be reconnected with equal speed and ease.

A further object is to provide a device of the above defined nature which may be quickly and easily connected with a row boat or other boat to be used in fishing, and may be removed equally as conveniently when disembarking.

Still further objects are to provide a device of the above defined nature which requires no tying of the stringing line and one which may be used as a handle when carrying a string of fish without danger of either end of the line becoming accidentally released.

Figure 1 is a perspective view.

Figure 2 is an outer side elevation, partly broken away and in section.

In the drawing above briefly described, a preferred construction has been illustrated and while that construction will be specifically described, it is to be understood that minor variations may be made within the scope of the invention as claimed.

The device is formed from a single strip 3 of brass or other springy metal. The intermediate portion 4 of the strip 3 is disposed horizontally and constitutes an elongated top plate 4. From the inner end of this top plate, one end portion of the strip is bent downwardly at a right angle to provide an inner clip arm 5. At the outer end of the top plate 4, the strip is provided with a downward return bend 6 and from this bend is extended horizontally toward the clip arm 5 to provide a lower plate 7 which is spaced downwardly from and underlies the outer end portion of the top plate 4. The other end portion of the metal strip is bent downwardly at a right angle from the inner end of the lower plate 7 and provides an outer clip arm 8 parallel with and spaced from the arm 5, the two arms 5 and 8 cooperating with the elements 4, 6 and 7 in forming a spring clip to straddle one wall of a row-boat or other boat used for fishing.

A central longitudinal portion of the outer arm 8 is bent outwardly and suitably shaped to form a spring finger 9 for connecting the usual ring 10 on one end of a fish stringing line 11, to said arm 8. The top plate 4 and the lower plate 7 are formed with vertically alined openings 12 to snugly receive the usual spike 13 on the other end of the line 11. Thus, the line will be effectively connected with the supporting clip and whenever a fish is to be strung on said line, it is an easy matter to withdraw the spike 13 from the openings 12, string the fish, and re-engage said spike with said openings, which is much easier and much more rapid than conventional ways of fish stringing. The device effectively holds the stringing line so there is no danger of any of the strung fish jerking it loose when lashing about in the water.

When disembarking, the clip, still connected with the string of fish, may be easily lifted from the boat and used as a carrying handle for the catch. When removing the fish, the spike 13 is of course pulled from the openings 12, but the ring 10 may remain connected with the clip in readiness for future use of the device.

Excellent results may be attained from the specific construction shown and described and it may, therefore, be considered as preferred, attention, however, being again invited to the possibility of making variations within the scope of the invention as claimed.

We claim:

1. A device of the class described comprising a single resilient metal strip having its intermediate portion disposed substantially horizontally to provide an elongated top plate, one end portion of said strip being bent downwardly from the inner end of said top plate and forming an inner vertical clip arm, said strip having a downward return bend at the outer end of said top plate and being extended horizontally from said return bend toward said inner clip arm to provide a lower plate spaced downwardly from and underlying the outer end portion of said top plate, the other end portion of said strip being bent downwardly from the inner end of said lower plate and providing an outer clip arm spaced outwardly from said inner clip arm, said outer clip arm having a spring finger for anchoring the usual ring on one end of a fish stringing line to said outer clip arm, said outer end portion of said top plate and said lower plate having vertically alined openings to receive the usual spike at the other end of the stringing line, said inner and outer clip arms cooperating with said upper and lower plates and said return bend in forming a spring clip to straddle a wall of a boat.

2. A device of the class described comprising a single resilient metal strip having its intermediate portion disposed substantially horizontally to provide an elongated top plate, one end portion of said strip being bent downwardly from the inner end of said top plate and forming an inner vertical clip arm, said strip having a downward return bend at the outer end of said top plate and being extended horizontally from said return bend toward said inner clip arm to provide a lower plate spaced downwardly from and underlying the outer end portion of said top plate, the other end portion of said strip being bent downwardly from the inner end of said lower plate and providing an outer clip arm spaced outwardly from said inner clip arm, a longitudinal portion of said outer clip arm being stamped outwardly to provide a spring finger for anchoring the usual ring on one end of a fish stringing line to said outer clip arm, said outer end portion of said top plate and said lower plate having vertically alined openings to receive the usual spike at the other end of the stringing line, said inner and outer clip arms cooperating with said upper and lower plates and said return bend in forming a spring clip to straddle a wall of a boat.

EARL F. MURRAY.
CLARE E. HERMANN.

REFERENCES CITED

The following references are of record in the file of this patent:

UNITED STATES PATENTS

| Number | Name | Date |
|---|---|---|
| 1,350,390 | Stein | Aug. 24, 1920 |
| 1,360,180 | Congdon | Nov. 23, 1920 |
| 1,800,075 | Imrie | Apr. 7, 1931 |